United States Patent
Schwitzky

[11] Patent Number: 5,932,888
[45] Date of Patent: Aug. 3, 1999

[54] WEB OR SHEET EDGE POSITION MEASUREMENT PROCESS AND DEVICE

[75] Inventor: Volkmar Rolf Schwitzky, Würzburg, Germany

[73] Assignee: Koenig & Bauer-Albert Aktiengesellschaft, Wurzburg, Germany

[21] Appl. No.: 08/894,368

[22] PCT Filed: Feb. 23, 1996

[86] PCT No.: PCT/DE96/00299

§ 371 Date: Aug. 22, 1997

§ 102(e) Date: Aug. 22, 1997

[87] PCT Pub. No.: WO96/26417

PCT Pub. Date: Aug. 29, 1996

[30] Foreign Application Priority Data

Feb. 24, 1995 [DE] Germany .......................... 195 06 467

[51] Int. Cl.⁶ ............................................ G01N 21/86
[52] U.S. Cl. ........................... 250/559.36; 250/559.12; 356/429
[58] Field of Search .................. 250/559.36, 559.12; 356/429, 431, 430

[56] References Cited

U.S. PATENT DOCUMENTS

| | | |
|---|---|---|
| 3,736,063 | 5/1973 | Ohno et al. . |
| 4,007,992 | 2/1977 | Petrohilos et al. . |
| 4,110,627 | 8/1978 | Isherwood . |
| 4,247,204 | 1/1981 | Merlen et al. ........................... 356/431 |
| 4,367,487 | 1/1983 | Klein et al. . |
| 4,559,451 | 12/1985 | Curl ................................... 250/559.36 |
| 4,662,756 | 5/1987 | Duran, Jr. . |
| 4,680,806 | 7/1987 | Bolza-Schunemann ................... 382/65 |
| 4,924,790 | 5/1990 | Kondo et al. ............................. 112/272 |
| 5,006,719 | 4/1991 | Blaser ................. 250/559.36 |
| 5,214,294 | 5/1993 | Toyofuku ........................... 250/559.36 |
| 5,229,620 | 7/1993 | Pahr .................................. 250/559.36 |
| 5,301,129 | 4/1994 | Mckaughan et al. .................... 364/552 |
| 5,389,789 | 2/1995 | Nguyen ............................... 350/341.1 |
| 5,489,784 | 2/1996 | Koiranen et al. ....................... 250/548 |
| 5,724,150 | 3/1998 | Schaede et al. ........................ 356/429 |
| 5,765,367 | 6/1998 | Schaede et al. ........................ 356/429 |

FOREIGN PATENT DOCUMENTS

| | | |
|---|---|---|
| 2179224 | 11/1973 | France . |
| 2 346 680 | 4/1977 | France . |
| 1 623 301 | 12/1970 | Germany . |
| 2 202 087 | 9/1972 | Germany . |
| 2 140 939 | 3/1973 | Germany . |
| 30 32 950 | 4/1982 | Germany . |
| 83 20 768 | 12/1985 | Germany . |
| 60-80703 | 5/1985 | Japan . |
| 63-191003 | 8/1988 | Japan . |
| 4-055705 | 2/1992 | Japan . |
| 4-295703 | 10/1992 | Japan . |
| 956636 | 4/1964 | United Kingdom . |

Primary Examiner—Edward P. Westin
Assistant Examiner—Thanh X. Luu
Attorney, Agent, or Firm—Jones, Tullar & Cooper, P.C.

[57] ABSTRACT

The position of an edge of a web or sheet is measured using a photoelectric measuring device. Any edge anomalies will generate extreme edge position values. These extreme values are used together with other, more representative values, to determine an initial position of the web edge. These extreme values are then eliminated since they exceed a tolerance threshold. A revised determination of the edge location is made using the remaining position values.

2 Claims, 2 Drawing Sheets

WEB OR SHEET EDGE POSITION MEASUREMENT PROCESS AND DEVICE

FIELD OF THE INVENTION

The present invention relates to a device and a method for measuring a position of an edge of webs or sheets by means of a photoelectric measuring device.

DESCRIPTION OF THE PRIOR ART

A measuring device for the photoelectric measurement of the position of sheet edges in respect to a reference line is known from DE-OS 22 02 087. Light emanating from an illumination device is received by a photoelectrical receiver. A video signal is generated in accordance with the position of the sheet edge which is inserted between the illumination device and the receiver.

The photoelectric receiver element consists of a plurality of individual photo elements arranged one behind the other at short distances.

In connection with this prior art device it is disadvantageous that even the slightest defects or fibers at the sheet edge to be measured lead to erroneous measurements, since these defects have a direct effect on the measurement result.

SUMMARY OF THE INVENTION

It is an object of the present invention to create a device and a method for measuring a position of an edge of webs or sheets by use of a photoelectric measuring device, wherein the actual position of the edge in relation to a measuring device is determined with sufficient accuracy in spite of the presence of small defects or of fibers extending past a vertical projection of the edge, for example so-called anomalies, in the measurement area of the edge of webs or sheets.

This object is attained in accordance with the present invention by means of a device and a method for measuring the position of an edge of webs or sheets which uses a photoelectric measuring device having an illumination device and a photoelectric receiver. At least three measured values of a position of an edge are determined. A measured result is formed in a way which disregards extreme values caused by edge anomalies.

The position of an edge of webs or sheets to be measured is detected in an advantageous manner by the device in accordance with the present invention at a plurality of closely adjoining points along the edge. Because of this, it is possible to neglect measured values of places where edge anomalies occur. The measured values can be processed by means of the method in accordance with the present invention in such a way that a sufficiently accurate determination of the position of the edge takes place.

In addition, it is advantageous that with a not ideally straight edge of the webs or sheets a virtual straight line along a considered area of the edge can be calculated, and that this is used as a measurement of the position of the edge for further processing. A sharp picture of the edge is obtained by means of the use of a light beam with parallel rays. A single illumination device for all photoelectric receivers reduces the components and therefore the cost.

BRIEF DESCRIPTION OF THE DRAWINGS

The device in accordance with the present invention and the method in accordance with the present invention are represented in the drawings and will be described in greater detail below. As shown in the drawings.

DETAILED DESCRIPTION OF THE PREFERRED EMBODIMENT

The position of a web or sheet 1 is to be measured sheet in relation to a number of photoelectric receivers 2, with the web being bordered, at least within the measurement area, by an edge 3 extending in the shape of a straight line. This web or this sheet is essentially light-absorbing. This web or sheet 1 is preferably a paper web or a sheet of paper, in particular for use in rotary printing presses, but also be other web- or panel-shaped goods, for example sheet metal or foils. This web or sheet 1 will be simply called web 1 hereinafter.

Figure 2:
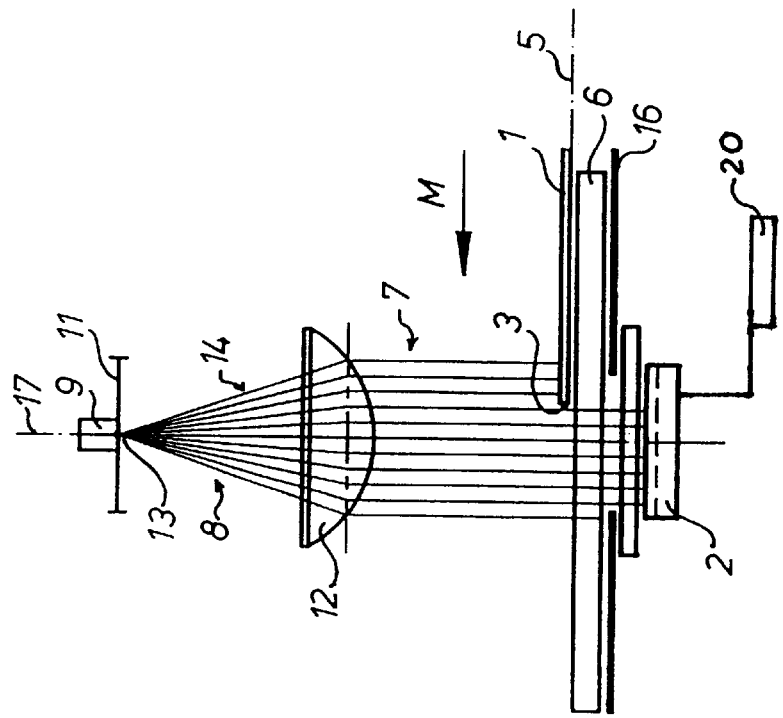
FIG. 2, is a schematic side elevation view of the device in accordance with the invention taken in the transportation direction of the web.
Figure 1:
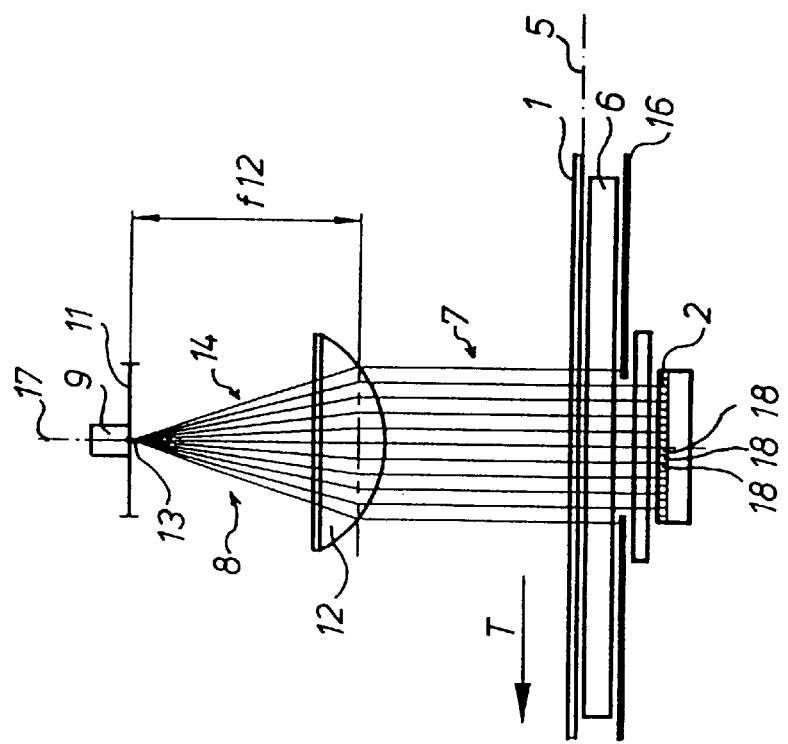
FIG. 1, is a schematic side elevation view of a device in accordance with the invention taken perpendicularly in respect to the transportation direction of the web.
Figure 3:
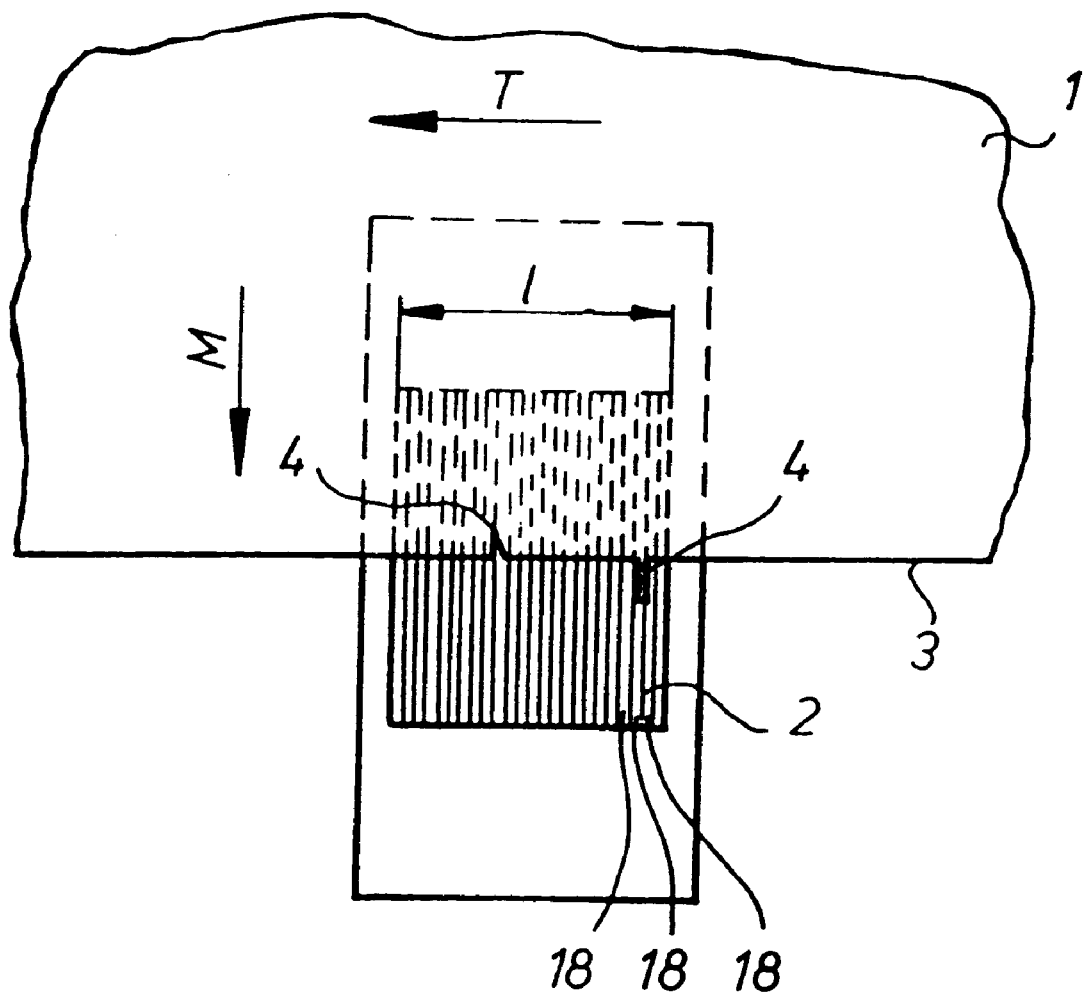
FIG. 3, is a schematic top view of a plurality of photoelectric receivers with the web.

The edge 3 of the web 1 to be measured can have anomalies 4 in the form of, for example, small defects, tears or fibers, which can extend past a perpendicular projection of the edge 3, as seen in FIG. 3.

The web 1, which is bordered by an edge 3 with anomalies 4, is entered into a parallel light beam 7 while being supported on the object holder 6 of an illumination device 8. The illumination device 8 essentially consists of a diffusedly radiating light source 9, for example an infrared (IR) light source 9, a diaphragm 11 and a condenser 12.

The diaphragm 11 is provided with a very narrow aperture 13, for example a bore of a diameter of approximately 0.05 mm to 1 mm and is disposed directly following the IR light source 9, which radiates light of a wave length of, for example, 750 nm. An almost punctiform or point-like IR light source is created by means of this. The condenser 12 is located at a distance f12, which corresponds to a focal depth f12 of the condenser 12, i.e. the IR light source 9 is located in the front focal point of the condenser 12. In the example depicted, an aspherical lens is used as the condenser 12. The condenser 12 can also consist of several lenses, for example a combination of a concave-convex lens and one or several aspherical lenses. In the preferred embodiment the condenser 12 parallelizes the light rays 14 emanating from the punctiform IR light source 9 to form a light beam 7 with parallel rays.

This parallel light beam 7 can, for example, also be created by means of a laser curtain or a laser expansion system.

In the present preferred embodiment, one light beam 7 illuminates all photoelectrical receivers 2 together.

The light beam 7 emanates from the illuminating device 8, penetrates the object carrier 6 as well as an IR filter 16 and impinges on the photoelectrical receivers 2.

The task of the IR filter 16 is to eliminate daylight. The illuminating device, the object carrier 6, the IR filter 16 and the photoelectric receivers 2 are arranged along an optical axis 17.

Thus, the edge 3 or a shadow of the web 1 are represented on the photoelectric receivers 2.

A plurality, i.e. at least three photoelectric receivers 2 are closely arranged next to each other at a short length l, as seen in FIG. 3 extending parallel with the edge 3 to be measured. The length l preferably is less than 50 mm. For example, photoelectric receivers 2 provided with a plurality of photoelements, such as a CCD field, known per se, or several CCD line sensors (charge-coupled device), arranged closely next to each other, can be employed to act as the photoelectric receivers 2. One line 18 of this CCD field of receivers 2, or of the CCD line sensor 2, can consist, for example, of 1728 measuring elements arranged in a line 18. For example, these measuring elements can have a size of 10 μm×13 μm, and a mean distance between two measuring elements may be 10 μm, so that there are 100 measuring elements in on one millimeter. In the preferred embodiment the position of the edge 3 of the web 1 is determined perpendicularly in respect to a measuring track or travel direction "T" of the web 1 and in a measuring direction "M". Therefore the individual lines 18 of the CCD field of sensors 2 are arranged in a direction extending perpendiculary to the transport direction "T" in such a way that the lines 18 in the area of the edge 3 to be measured are partially covered by the web 1. The measuring direction "M" is located parallel to a plane 5 covered by the web 1 and perpendicularly in respect to the edge 3 to be measured.

Each line 18 of the CCD field of sensors 2 is evaluated in a suitable electronic evaluation unit 20, so that a plurality of measured values, at least three, regarding the position of the web 1 are available. These plurality of measured values correspond to the positions of adjoining, differentially small portions of the edge 3 of the web 1. If one or several anomalies 4 are now in the measuring area, the corresponding extreme values caused by these edge anomalies 4 differ from the remaining measured values. These extreme values are not considered in the final evaluation in that an initial average value, for example, is formed and all measured values exceeding this initial average value, which determine a tolerance threshold, are not used for further calculations. A fresh, revised average value is formed from the remaining measured values, which then for further processing represents the determined measurement result for the position of the edge 3.

It is also possible to determine the position of a straight line corresponding to the position of the edge 3 by means of other mathematical processes, such as straight lines of regression, statistical frequency distribution, least error squares, etc., and to use them for further processing.

While a preferred embodiment of a device and a method for measuring a position of a web in accordance with the present invention has been set forth fully and completely hereinabove, it will be apparent that changes in, for example, the type of web, the particular light source, the lens system and the like could be made without departing from the true spirit and scope of the present invention which is accordingly to be limited only by the following claims.

What is claimed is:

1. A method for measuring a position of an edge of a web by means of a photoelectric measuring device consisting of an illumination device and a photoelectric receiver, characterized in that at least three measured values of a position of an edge are determined, that an initial average value is determined using said at least three measured values of a position of an edge, that extreme values of the measured values of a position of an edge exceeding said initial average value and based on anomalies of the edge are removed from further consideration, and that from the remaining measured values of a position of an edge a determined measurement result is formed whereby said extreme values of the measured values of a position of an edge based on anomalies of the edge have no effect on said determined measurement result.

2. A method for determining a location of an edge of a web including:

providing a photoelectric measuring device having a light source and a plurality of photoelectric receivers;

directing light beams from said light source onto said photoelectric receivers;

positioning an edge of a web in said light beams between said light source and said photoelectric receivers;

utilizing said photoelectric receivers to generate a plurality of measured values, said measured values corresponding to adjoining, differentially small portions of said edge;

determining an initial average value of said plurality of measured values;

using said initial average value to determine a tolerance threshold;

comparing all of said plurality of measured values to said tolerance threshold;

discarding any of said plurality of measured values excluding said tolerance threshold; and using all remaining measured values to determine a revised average value, said revised average value representing said location of said edge of said web.

* * * * *